United States Patent
Liu et al.

(10) Patent No.: US 11,310,751 B2
(45) Date of Patent: Apr. 19, 2022

(54) MAXIMUM PERMISSIBLE EXPOSURE ASSISTED UPLINK TRAFFIC GRANT ALLOCATION

(71) Applicant: QUALCOMM Incorporated, San Diego, CA (US)

(72) Inventors: Tienyow Liu, Santa Clara, CA (US); Mingming Cai, San Jose, CA (US); Raghu Narayan Challa, San Diego, CA (US); Junsheng Han, Sunnyvale, CA (US); Farhad Meshkati, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 16/883,950

(22) Filed: May 26, 2020

(65) Prior Publication Data
US 2020/0383067 A1  Dec. 3, 2020

Related U.S. Application Data

(60) Provisional application No. 62/853,648, filed on May 28, 2019.

(51) Int. Cl.
*H04W 52/36* (2009.01)
*H04B 17/336* (2015.01)
(Continued)

(52) U.S. Cl.
CPC ........ *H04W 52/367* (2013.01); *H04B 17/336* (2015.01); *H04L 1/0003* (2013.01);
(Continued)

(58) Field of Classification Search
CPC ....... H04W 52/00–60; H04W 72/0413; H04W 72/0473; H04W 72/1278; H04B 17/336;
(Continued)

(56) References Cited

U.S. PATENT DOCUMENTS

2012/0063426 A1\* 3/2012 Noh ............ H04L 5/0048
370/336
2017/0302362 A1\* 10/2017 High ............ H04L 67/306
(Continued)

FOREIGN PATENT DOCUMENTS

EP           2410661 A1   1/2012
WO   2019223657 A1   11/2019

OTHER PUBLICATIONS

Haider A., "Maximum Transmit Power for UE in an LIE Small Cell Uplink", Division of Electronics and Electrical Engineering, Dongguk University-Seoul, Seoul, Korea, Jul. 2019, pp. 1-26.
(Continued)

*Primary Examiner* — Raymond S Dean
(74) *Attorney, Agent, or Firm* — Qualcomm Incorporated

(57) ABSTRACT

Wireless communication devices are adapted to utilize maximum permissible exposure requirements in determining uplink traffic grant allocations within wireless communication systems. According to one example, a wireless communication device can determine one or more candidate uplink duty cycles for a subsequent uplink transmission interval based at least in part on an MPE requirement, determine a maximum number of resource blocks per symbol and a maximum MSC index associated with each of the one or more candidate uplink duty cycles from a predefined MCS index table, and select a duty cycle, number of resource blocks per symbol, and MCS that facilitates a largest number of un-coded bits for the subsequent uplink transmission interval. Other aspects, embodiments, and features are also included.

28 Claims, 11 Drawing Sheets

(51) Int. Cl.
*H04L 1/00* (2006.01)
*H04W 52/24* (2009.01)
*H04W 72/04* (2009.01)

(52) U.S. Cl.
CPC ....... *H04W 52/243* (2013.01); *H04W 52/365* (2013.01); *H04W 72/0413* (2013.01); *H04W 72/0473* (2013.01)

(58) Field of Classification Search
CPC ... H04B 1/3838; H04L 1/0003; H04L 5/0046; H04L 5/0053
See application file for complete search history.

(56) References Cited

U.S. PATENT DOCUMENTS

| | | | |
|---|---|---|---|
| 2018/0167897 A1 | 6/2018 | Sampath et al. | |
| 2018/0368108 A1 | 12/2018 | Zeng et al. | |
| 2019/0208537 A1 | 7/2019 | Ke et al. | |
| 2019/0261289 A1 | 8/2019 | Raghavan et al. | |
| 2020/0037254 A1 | 1/2020 | Comsa et al. | |
| 2020/0068493 A1 | 2/2020 | Ding et al. | |
| 2020/0112926 A1 | 4/2020 | Laghate et al. | |
| 2020/0112927 A1 | 4/2020 | Han et al. | |
| 2020/0120698 A1 | 4/2020 | Yang et al. | |
| 2020/0145927 A1* | 5/2020 | Sun | H04W 52/146 |
| 2020/0314764 A1* | 10/2020 | Noh | H04B 7/0617 |
| 2020/0314765 A1* | 10/2020 | Jung | H04W 52/34 |
| 2020/0411960 A1* | 12/2020 | Ng | G01S 7/417 |

OTHER PUBLICATIONS

Intel Corporation: "Uplink Duty Cycle and Power Back-Off Considerations for FR2", 3GPP Draft, R4-1813526—Uplink Duty Cycle and Power Back-Off Considerations for FR2, 3rd Generation Partnership Project (3GPP), Mobile Competence Centre, 650, Route Des Lucioles, F-06921 Sophia-Antipolis Cedex, France, vol. RAN WG4, No. Chengdu, China, Aug. 8, 2018-Aug. 12, 2018, Sep. 28, 2018 (Sep. 28, 2018), XP051582191, 3 pages, Retrieved from the Internet: URL: http://www.3gpp.org/ftp/tsg%5Fran/WG4%5FRadio/TSGR4%5F88Bis/Docs/R4%2D1813526%.
International Search Report and Written Opinion—PCT/US2020/034663—ISA/EPO—dated Jul. 30, 2020.

* cited by examiner

MAXIMUM PERMISSIBLE EXPOSURE ASSISTED UPLINK TRAFFIC GRANT ALLOCATION

PRIORITY CLAIM

This application claims priority to and the benefit of provisional patent application no. 62/853,648 filed in the United States Patent and Trademark Office on May 28, 2019, the entire content of which is incorporated herein by reference as if fully set forth below in its entirety and for all applicable purposes.

TECHNICAL FIELD

The technology discussed below relates generally to wireless communication systems, and more particularly, to maximum permissible exposure requirements for user equipment (UE). Some embodiments and techniques enable and provide communication devices, methods, and systems for utilizing maximum permissible exposure requirements in determining uplink traffic grant allocations within wireless communication systems.

INTRODUCTION

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power).

As the demand for mobile broadband access continues to increase, research and development continue to advance wireless communication technologies not only to meet the growing demand for mobile broadband access, but to advance and enhance the user experience with mobile communications. For example, the third generation partnership project (3GPP) is an organization that develops and maintains telecommunication standards for fourth generation (4G) long-term evolution (LTE) networks. Recently, the 3GPP has begun the development of a next-generation evolution of LTE called New Radio (NR), which may correspond to a fifth generation (5G) network. As it stands today, 5G NR networks may exhibit a higher degree of flexibility and scalability than LTE, and are envisioned to support very diverse sets of requirements.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

Some embodiments and techniques of the present disclosure enable and provide communication devices, methods, and systems for utilizing maximum permissible exposure requirements in determining uplink traffic grant allocations within wireless communication systems.

Various aspects of the present disclosure may include wireless communication devices. According to at least one implementation, a wireless communication device may include a transceiver coupled with a processor. The processor may be configured to determine one or more candidate uplink duty cycles for a subsequent uplink transmission interval based at least in part on a maximum permissible exposure (MPE) requirement. The processor may further be configured to determine a maximum number of resource blocks per symbol and a maximum modulation and coding scheme (MSC) index associated with each of the one or more candidate uplink duty cycles from a predefined MCS index table. The processor may further be configured to select a duty cycle, number of resource blocks per symbol, and MCS that facilitates a largest number of un-coded bits for the subsequent uplink transmission interval.

Additional aspects include methods operational on a wireless communication device, and apparatus including means for performing such methods. According to at least one example, such methods may include determining one or more candidate uplink duty cycles for a subsequent uplink transmission interval based at least in part on a MPE requirement, determining a maximum number of resource blocks per symbol and a maximum MSC index associated with each of the one or more candidate uplink duty cycles from a predefined MCS index table. Further, such methods may include selecting a duty cycle, number of resource blocks per symbol, and MCS that facilitates a largest number of un-coded bits for the subsequent uplink transmission interval.

Still further aspects of the present disclosure include computer-readable storage mediums storing processor-executable programming. In at least one example, the processor-executable programming may be adapted to cause a processing circuit to determine one or more candidate uplink duty cycles for a subsequent uplink transmission interval based at least in part on a MPE requirement, and determine a maximum number of resource blocks per symbol and a maximum MSC index associated with each of the one or more candidate uplink duty cycles from a predefined MCS index table. The processor-executable programming may further be adapted to cause a processing circuit to select a duty cycle, number of resource blocks per symbol, and MCS that facilitates a largest number of un-coded bits for the subsequent uplink transmission interval.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Figure 1:
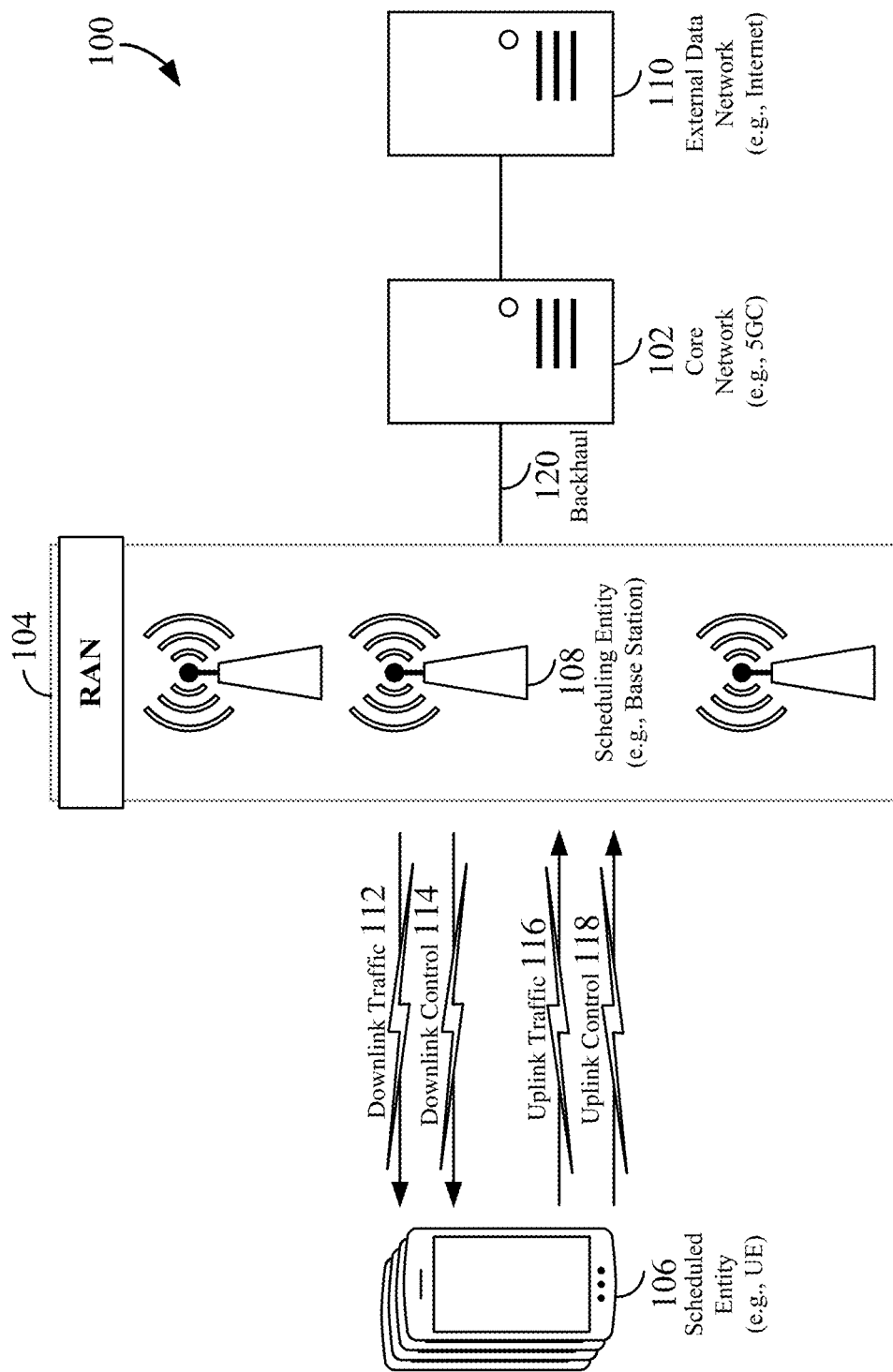
FIG. 1 is a schematic diagram illustrating an example of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, vehicles, aircraft, and ships, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
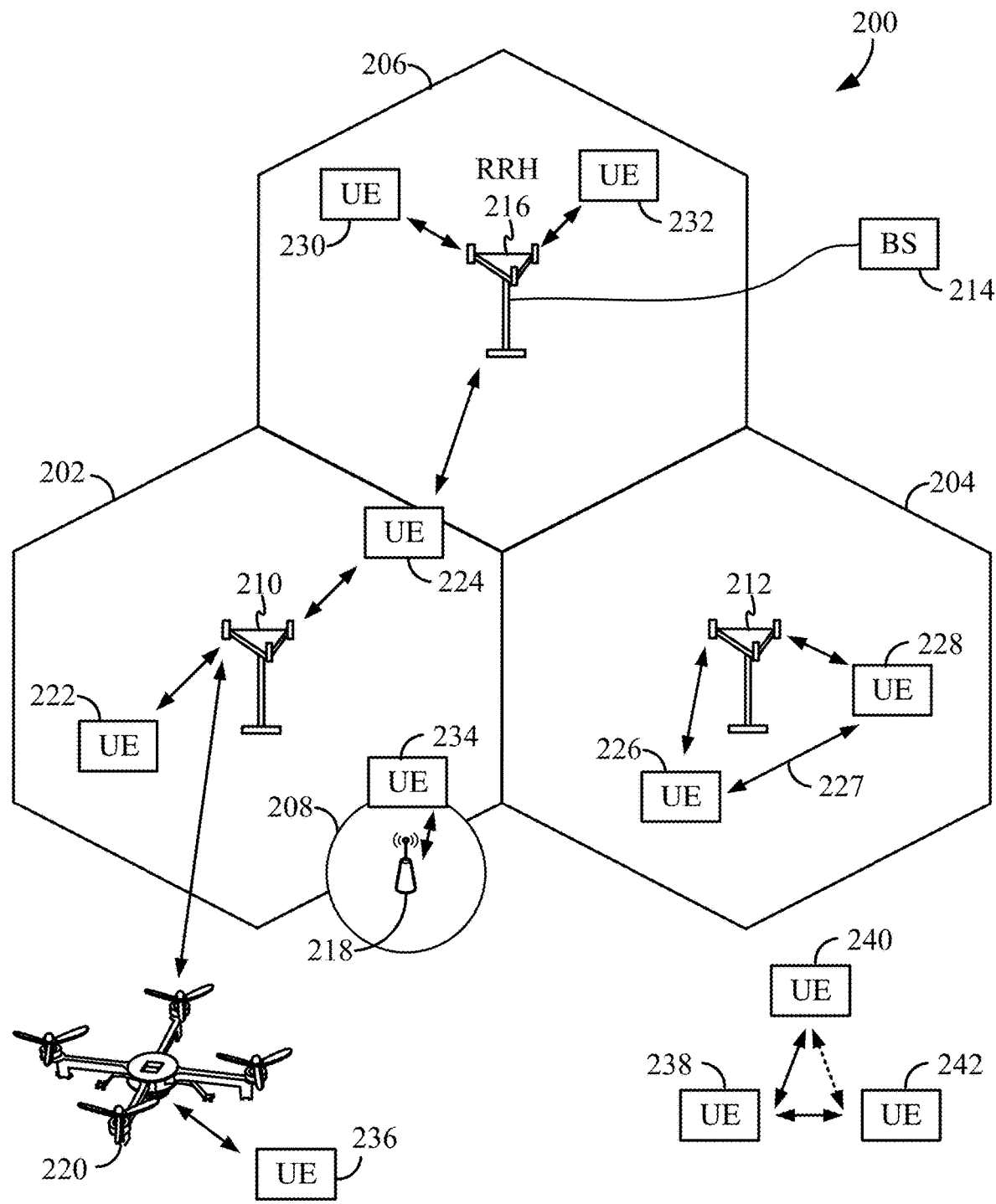
FIG. 2 is a conceptual diagram illustrating an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204, and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210, UEs 226 and 228 may be in communication with base station 212, UEs 230 and 232 may be in communication with base station 214 by way of RRH 216, UE 234 may be in communication with base station 218, and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time—frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1). In some scenarios, the AMF may include a security context management function (SCMF) that manages, in whole or in part, the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks can enable uplink-based mobility framework and improve the efficiency of both the UE and the network. Efficiencies may be brought about because the number of mobility messages that need to be exchanged between the UE and the network may be reduced.

Figure 3:
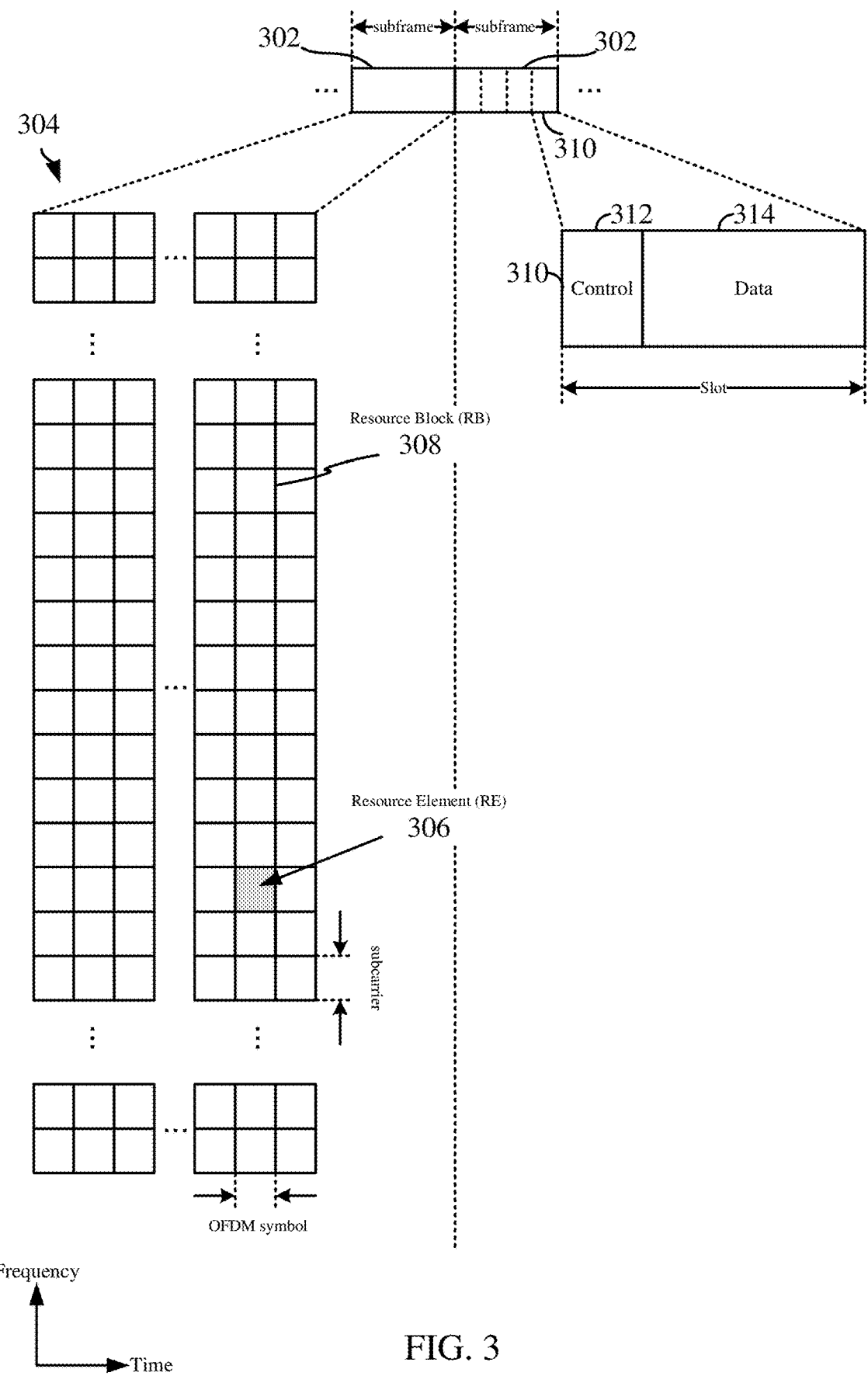
FIG. 3 is a schematic diagram illustrating organization of wireless resources in an air interface utilizing orthogonal frequency divisional multiplexing (OFDM) according to some aspects.

Various aspects of the present disclosure will be described with reference to an OFDM waveform, schematically illustrated in FIG. 3. It should be understood by those of ordinary skill in the art that the various aspects of the present disclosure may be applied to an DFT-s-OFDMA waveform in substantially the same way as described herein below. That is, while some examples of the present disclosure may focus on an OFDM link for clarity, it should be understood that the same principles may be applied as well to DFT-s-OFDMA waveforms and other waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time—frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each subframe 302 (e.g., a 1 ms subframe) may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

As UEs operate within a wireless communication system, a UE typically transmits uplink signals to a base station only in time and frequency resources assigned by the base station. The base station typically schedules and allocates the time and frequency resource to a UE based on some traditional considerations to satisfy quality of service (QoS) requirements, limited UE power budget, etc. In some wireless communication systems, such as those implementing 5G NR, a wide range of frequency bands may be supported, as well as a flexible system bandwidth (e.g., enhanced mobile broadband (eMBB)/ultra-reliable low latency communication (URLLC), massive machine-type communication (mMTC), or millimeter wave (mmWave)).

Millimeter waves (mmWaves) are absorbed within the first one or two millimeters of human skin, and thermal heating effects may occur when the power density of the waves is above 5-10 milliwatts per centimeter squared (mW/cm$^2$). Therefore, for mmWave frequencies, maximum permissible exposure (MPE) requirements have been adopted by various regulatory bodies, such as the International Commission on Non-Ionizing Radiation Protection (ICNIRP) and Federal Communications Commission (FCC) in the United States. The MPE limits the power density of a transmitting antenna. As a result, a UE may not be able to transmit at a relatively high power in order to satisfy a QoS requirement. In addition, a base station may not be able to freely allocate available resources to a UE for uplink transmissions.

According to one or more aspects of the present disclosure, UEs can be configured to dynamically calculate their maximum transmit power level permitted according to the MPE requirements. Further, a UE and/or base station may identify one or more candidate uplink duty cycles based on total available energy for an upcoming transmission designated by the MPE requirements. The UE and/or base station can further identify the largest number of RBs per symbol and modulation and a coding scheme (MCS) index associated with each of the one or more candidate uplink duty cycles to facilitate the largest number of un-coded bits.

Figure 4:
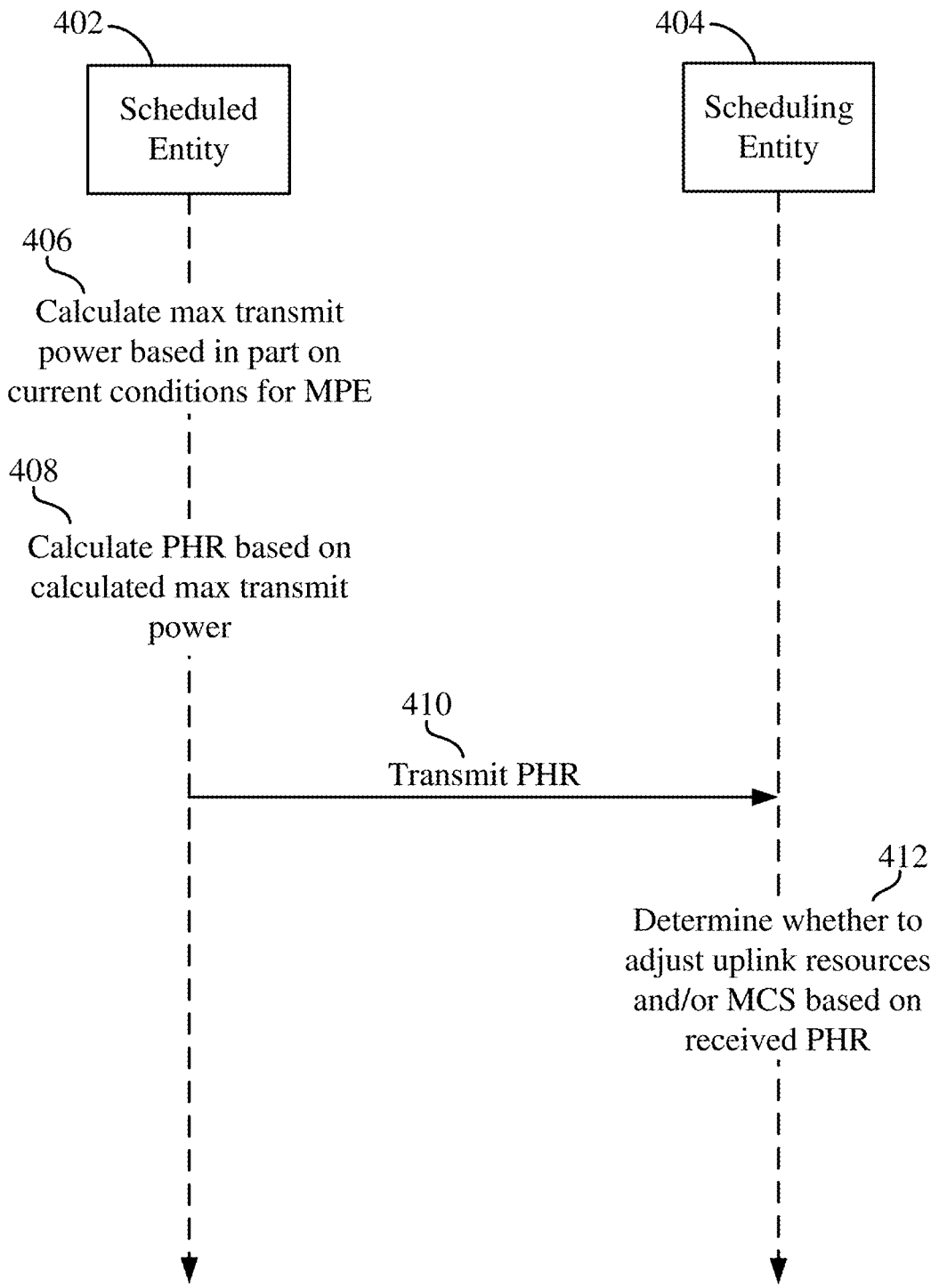
FIG. 4 is a flow diagram illustrating an example for utilizing a power headroom report base in part on MPE to determine time and frequency resources and/or modulation and coding schemes for uplink transmissions according to some aspects.

Referring to FIG. 4, a flow diagram is depicted illustrating an example for utilizing a power headroom report based in part on MPE requirements to determine time and frequency resources and/or modulation and coding schemes for uplink transmissions. In FIG. 4, a scheduled entity 402 and a scheduling entity 404 are depicted. As shown, the scheduled entity 402 may calculate 406 a maximum transmit power ($P_{max}$) based at least in part on current conditions for MPE. Typically, the MPE requirements remain constant, but the maximum transmit power level ($P_{max}$) may vary with respect to the operation of the scheduled entity with relation to the user. For example, proximity of the scheduled entity to the user can result in a change of the maximum transmit power level within the MPE requirements (e.g., the closer to the user, the lower the $P_{max}$ within MPE requirements). As a result, the scheduled entity 402 can dynamically calculate the $P_{max}$ based on the changing conditions relative to the MPE requirements.

Utilizing the calculated $P_{max}$, the scheduled entity 402 can further calculate 408 a power headroom report (PHR) based on the calculated $P_{max}$. According to at least one example, the power headroom report may be calculated as the difference between the $P_{max}$ and the actual transmit power at a given interval. For example, the power headroom report may be calculated according to the equation: $PHR(i)=P_{max}(i)-P_{tx}(i)$, where PHR(i) represents the power headroom report at transmission interval 'i', $P_{max}(i)$ is the maximum transmit power level within the MPE requirements at the transmission interval, and $P_{tx}(i)$ is the actual UE transmit power at the transmission interval. A PHR that is a relatively large positive value may indicate that the scheduled entity 402 can transmit more power. A PHR that is relatively small (e.g., a negative value) may indicate that the current transmission has exceeded the $P_{max}$ limit for the scheduled entity 402.

The scheduled entity 402 can then transmit 410 the PHR to the scheduling entity 404. On receipt of the PHR from the scheduled entity 402, the scheduling entity 404 can determine 412 whether to adjust the uplink resources or modulation and coding scheme (MCS) for the scheduled entity 402. For example, if the PHR is sufficiently close to zero, the scheduling entity 404 may determine to leave the uplink resources and/or MCS unchanged for the scheduled entity 402. If the PHR is a relatively large positive value, the scheduling entity 404 may determine to schedule additional uplink resources (e.g., time, frequency) and/or higher MCS for uplink transmissions from the scheduled entity 402. If the PHR is a negative value, the scheduling entity 404 may determine to scheduled less uplink resources (e.g., time, frequency) and/or lower MCS for uplink transmissions from the scheduled entity 402.

Figure 5:
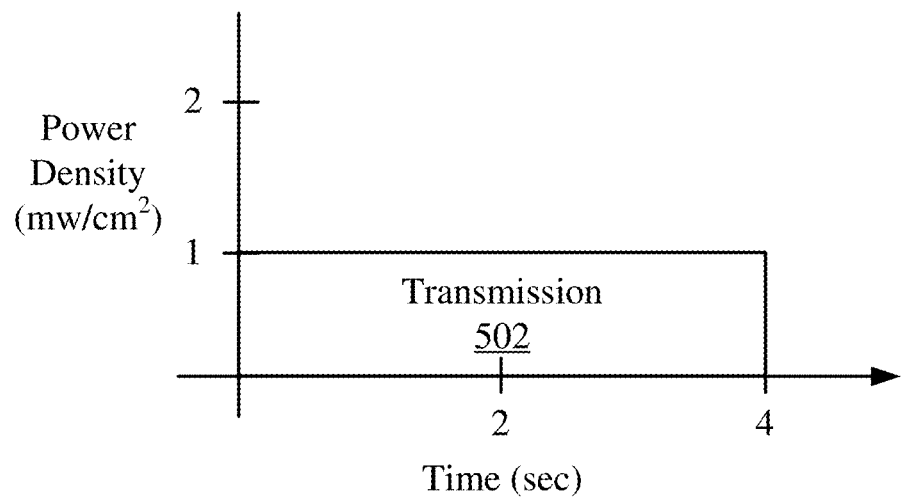
FIG. 5 is a block diagram illustrating examples of how transmissions may be configured to meet MPE requirements according to some aspects.
Figure 5:
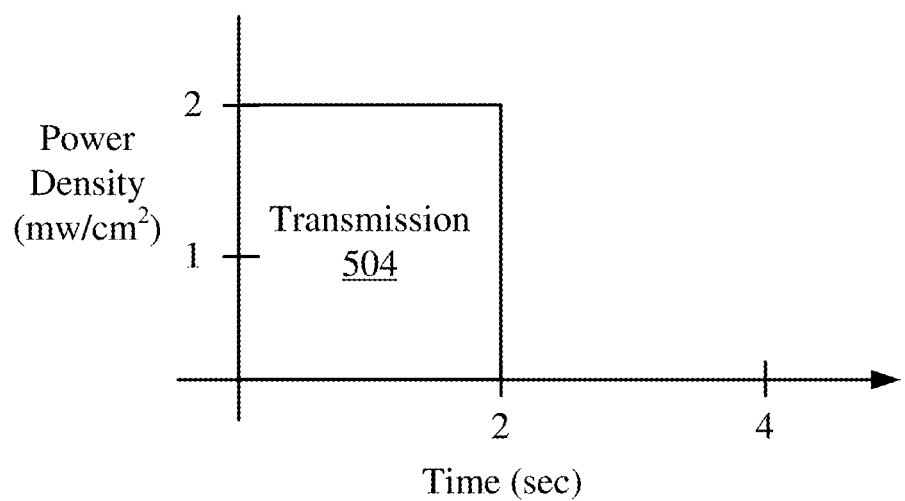

The PHR provides information relating to the current transmit power compared to a maximum transmit power within the MPE requirements. The MPE requirements typically limit the power density of a transmitting antenna averaged over a time window. Typically, the time window is 4 seconds, although the specific time window may vary in different implementations. As a result, the power density over a given period of time may vary, while still meeting the MPE requirements. For example, FIG. 5, illustrates two different transmissions 502 and 504. As shown, each transmission 502, 504 has the same total power density over a 4 second time window. In the first transmission 502, the power density is 1 mw/cm$^2$ over all 4 seconds of the time window. In the second transmission 504, the power density is 2 mw/cm$^2$ over the first 2 seconds of the time window, and 0 mw/cm$^2$ over the last 2 seconds of the time window. As a result, both transmissions 502, 504 may meet the MPE requirements, although the second transmission 504 may facilitate improved transmission characteristics by increasing the power density over a shorter period of time.

In various aspects of the present disclosure, a scheduled entity can dynamically compute the total available energy (E) available to the scheduled entity for the next uplink transmission interval within the MPE requirements, utilizing the PHR, as well as one or more other parameters, such as the maximum transmit power ($P_{max}$), uplink duty cycle, maximum power reduction (MPR), etc. In at least one example, the total available energy (E) may be calculated as $E=P_{max}(N \cdot \delta)$, where N is the total number of symbols in the next transmission and $\delta$ is the network configured uplink duty cycle. In some implementations, the value for $P_{max}$ may be determined as set forth above in the discussion about PHR, and is dependent on the MPE requirements. In other implementations, $P_{max}$ may be the result of $P_{powerclass}$–MPR, where $P_{powerclass}$ is a predefined value (e.g., defined by wireless standards) for the max power capability that the scheduled entity of its power class can transmit. In still other implementations, $P_{max}$ for the scheduled entity may be estimated by a scheduling entity using $P_{max}=P_{tx}+PHR$, where $P_{tx}$ (i.e., the scheduled entity's actual transmit power) is derived from the measured received SNR at the scheduling entity.

Given the total energy E bounded by the MPE requirements, a determination may be made to determine an uplink duty cycle ($\delta$), a number of resource blocks (RBs) per symbol ($N_{RB}$), and an MCS index (m) to allocate the total energy E such that the uplink throughput in the next transmission interval is maximized for the uplink transmission. These operations may be performed by a scheduled entity and/or a scheduling entity in various embodiments of the present disclosure. Accordingly, as used herein, the term wireless communication device may refer to either a scheduling entity or a scheduled entity.

According to one or more aspects of the present disclosure, a wireless communication device may determine one or more candidate uplink duty cycles ($\delta$) for a subsequent uplink transmission interval, and then determine the largest number of RBs per symbol ($N_{RB}$) and MCS index (m) associated with each of the one or more candidate uplink duty cycles ($\delta$). The wireless communication device can select the uplink duty cycle ($\delta$), number of RBs per symbol ($N_{RB}$), and MCS index (m) that facilitate the largest number of un-coded bits in a subsequent transmission interval.

In some examples, the wireless communication device may determine the one or more candidate uplink duty cycles ($\delta$) for a subsequent uplink transmission by initially determining a transmission power cap ($P_{cap}$) based on the total energy E (as bounded by the MPE requirements) divided by a product of the total number of symbols (N) and the uplink duty cycle ($\delta$), as expressed in the following formula:

$$P_{cap} = \frac{E}{N \cdot \delta}$$

It should be understood that the transmit power cap ($P_{cap}$) is constrained by the device maximum transmit power level ($P_{MTPL}$) for the UE (i.e., $P_{cap} \leq P_{MTPL}$). Additionally, the duty cycle ($\delta$) is constrained by the maximum uplink duty cycle configured by the network ($\delta_{NW}$) (i.e., $\delta \leq \delta_{NW}$).

To maximize the throughput for the given uplink transmission, the wireless communication device can identify each candidate uplink duty cycle ($\delta$) that is less than or equal to the network duty cycle, and is greater than or equal to the total energy (E) divided by a product of the total number of symbols in the next transmission interval (N) and the device maximum transmit power level ($P_{MTPL}$), as expressed by the following formula:

$$\frac{E}{N \cdot P_{MTPL}} \leq \delta \leq \delta_{NW}$$

Once the one or more candidate duty cycles ($\delta$) that fit within the two bounds of the above formula are determined, the wireless communication device may determine a maximum number of RBs per symbol ($N_{RB}$) and a maximum MCS index (m) that maximize the total un-coded bits in the subsequent transmission interval. More specifically, for each candidate duty cycle ($\delta$), the receive Carrier to Interference-plus-Noise Ratio (CINR) can be calculated by the following formula $$CINR_{dB} = \left(\frac{P_{cap}}{N_{RB}}\right)_{dB} - (PL)_{dB} - (P_{noise}^{RB})_{dB}$$

where $(PL)_{dB}$ is the pathloss including all TX/RX antenna gains and cable losses between the scheduled entity and the scheduling entity, $(P_{noise}^{RB})_{dB}$=−174+10·log$_{10}$(12·120·10$^3$)+ $(NF)_{dB}$ is the noise power per RB, $(NF)_{dB}$ is the base station receiver noise figure, and $N_{RB}$ is the number of RB's in frequency domain used per symbol. Notably, the number of RBs per symbol ($N_{RB}$) is the one value in the above CINR equation that is variable.

Using the CINR equation, the wireless communication device can find the largest number of RBs per symbol ($N_{RB}$) and MCS index (m) which satisfy CINR$_{DB}$≥CINR$_m$, where m is the MCS index in a predefined table. The predefined table may indicate an MCS index, a modulation for each MCS index, a code rate for each MCS index, a number of un-coded bits per subcarrier for each MCS index, and a minimum required CINR for each MCS index. Table 1 is an example of a predefined table provided for illustration purposes only.

TABLE 1

| MCS index (example only- not standard compliant) | Modulation | Code rate | Number of un-coded bits per subcarrier | Minimum required CINR (dB) at 10% (TBD) BLER |
|---|---|---|---|---|
| 0 | BPSK | $r_0$ | $r_0$ | $CINR_0$ |
| 1 | QPSK | $r_1$ | 2 · $r_1$ | $CINR_1$ |
| 2 | QPSK | $r_2$ | 2 · $r_2$ | $CINR_2$ |
| 3 | QPSK | $r_3$ | 2 · $r_3$ | $CINR_3$ |
| 4 | QPSK | $r_4$ | 2 · $r_4$ | $CINR_4$ |
| 5 | QPSK | $r_5$ | 2 · $r_5$ | $CINR_5$ |
| 6 | 16QAM | $r_6$ | 4 · $r_6$ | $CINR_6$ |
| 7 | 16QAM | $r_7$ | 4 · $r_7$ | $CINR_7$ |
| 8 | 16QAM | $r_8$ | 4 · $r_8$ | $CINR_8$ |
| ... | ... | ... | ... | ... |
| M | 64QAM | $r_M$ | 6 · $r_M$ | $CINR_m$ |

The corresponding number of un-coded bits per symbol may be defined by the following equation $$N_{bits}^{symbol} = N_{SC}^{RB} \cdot N_{RB} \cdot N_{bits}^{SC}(m) \cdot r_m,$$

where $N_{bits}^{SC}(m)$ is the number of modulation bits per subcarrier for MCS index (m) from the table. For example, $N_{bits}^{SC}(3)=2$, $N_{bits}^{SC}(12)=4$, etc.

The total number of un-coded bits that the scheduled entity can transmit in the next transmission interval can be identified using ($\delta$, $N_{RB}$, m) is $N_{bits}^{TI}$ ($\delta$, $N_{RB}$, m)=N·$\delta$·$N_{bits}^{symbol}$ for all candidate uplink duty cycles ($\delta$). The wireless communication device can then find the largest number of un-coded bits that the scheduled entity can transmit in the next transmission interval over all candidate duty cycles ($\delta$) utilizing the following equation $$N_{bits}^{TI}(\delta', N'_{RB}, m') = \arg\max_\delta N_{bits}^{TI}(\delta, N_{RB}, m).$$

Figure 6:
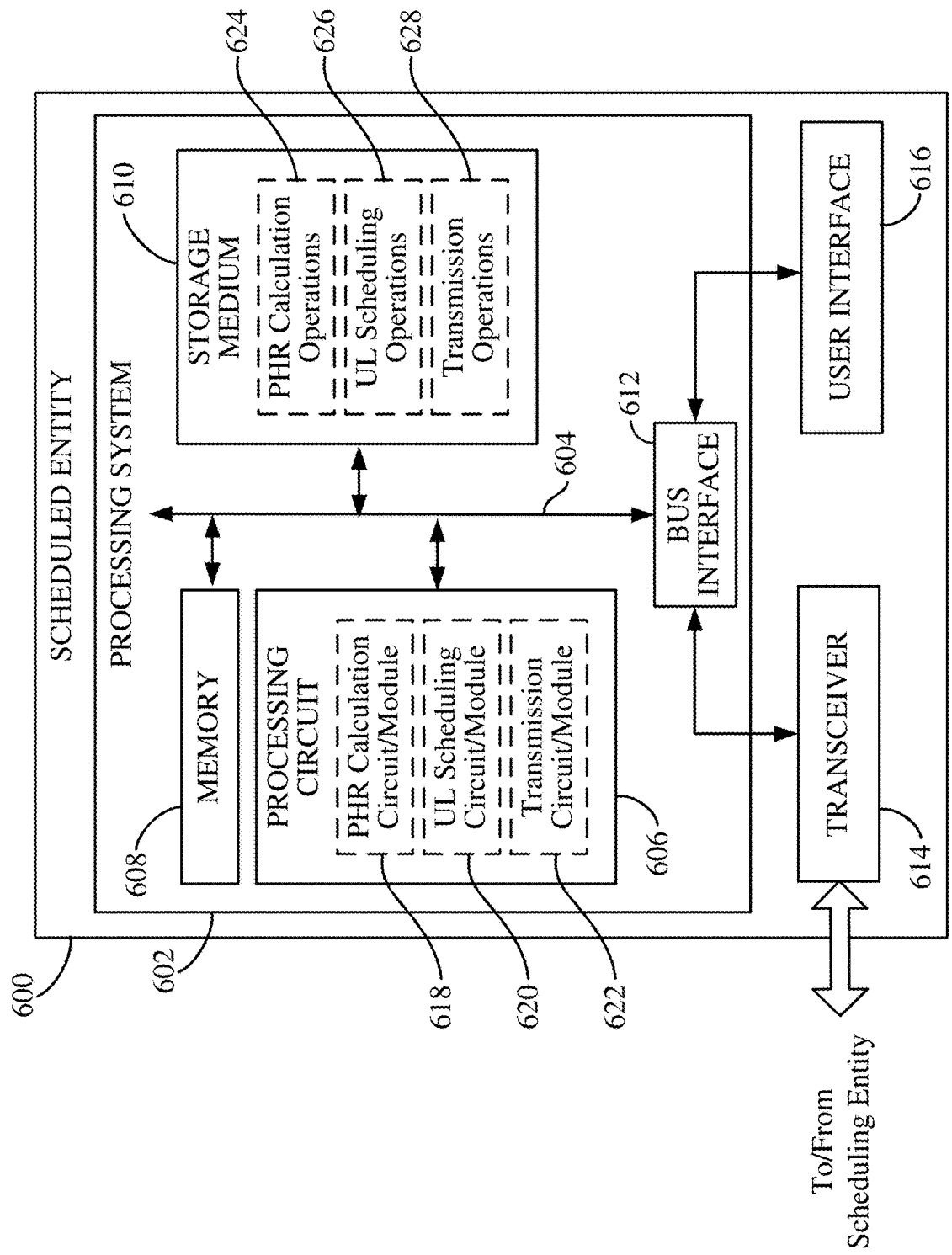
FIG. 6 is a block diagram conceptually illustrating an example of a hardware implementation for a scheduled entity according to some aspects.

FIG. 6 is a block diagram illustrating select components of a scheduled entity 600 employing a processing system 602 according to at least one example of the present disclosure. In this example, the processing system 602 is implemented with a bus architecture, represented generally by the bus 604. The bus 604 may include any number of interconnecting buses and bridges depending on the specific application of the processing system 602 and the overall design constraints. The bus 604 communicatively couples together various circuits including one or more processors (represented generally by the processing circuit 606), a memory 608, and computer-readable media (represented generally by the storage medium 610). The bus 604 may also link various other circuits such as timing sources, peripherals, voltage regulators, and power management circuits, which are well known in the art, and therefore, will not be described any further. A bus interface 612 provides an interface between the bus 604 and a transceiver 614. The transceiver 614 provides a means for communicating with various other apparatus over a transmission medium. Depending upon the nature of the apparatus, a user interface 616 (e.g., keypad, display, speaker, microphone, joystick) may also be provided.

The processing circuit 606 is responsible for managing the bus 604 and general processing, including the execution of programming stored on the computer-readable storage medium 610. The programming, when executed by the processing circuit 606, causes the processing system 602 to perform the various functions described below for any particular apparatus. The computer-readable storage medium 610 and the memory 608 may also be used for storing data that is manipulated by the processing circuit 606 when executing programming. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 606 is arranged to obtain, process and/or send data, control data access and storage, issue commands, and control other desired operations. The processing circuit 606 may include circuitry adapted to implement desired programming provided by appropriate media, and/or circuitry adapted to perform one or more functions described in this disclosure. For example, the processing circuit 606 may be implemented as one or more processors, one or more controllers, and/or other structure configured to execute executable programming and/or execute specific functions. Examples of the processing circuit 606 may include a general purpose processor, a digital signal processor (DSP), an application specific integrated circuit (ASIC), a field programmable gate array (FPGA) and/or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 606 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 606 are for illustration and other suitable configurations within the scope of the present disclosure are also contemplated.

In some instances, the processing circuit 606 may include a power headroom report (PHR) calculation circuit and/or module 618, a uplink (UL) scheduling circuit and/or module 620, and a transmission circuit and/or module 622. The PHR calculation circuit/module 618 may generally include circuitry and/or programming (e.g., programming stored on the storage medium 610) adapted to calculate a maximum transmit power ($P_{max}$) based at least in part on current conditions for MPE, and calculate a power headroom report (PHR) based on the calculated $P_{max}$. The UL scheduling circuit/module 620 may generally include circuitry and/or programming (e.g., programming stored on the storage medium 610) adapted to determine uplink scheduling information, including an uplink duty cycle ($\delta$), a number of resource blocks (RBs) per symbol ($N_{RB}$), and an MCS index (m) to allocate a total energy E bounded by the MPE requirements such that the uplink throughput in a subsequent transmission interval is maximized for an uplink transmission. The transmission circuit/module 622 may generally include circuitry and/or programming (e.g., programming stored on the storage medium 610) adapted to transmit the uplink scheduling information to a scheduling entity. As used herein, reference to circuitry and/or programming may be generally referred to as logic (e.g., logic gates and/or data structure logic).

The storage medium 610 may represent one or more computer-readable devices for storing programming, such as processor executable code or instructions (e.g., software, firmware), electronic data, databases, or other digital information. The storage medium 610 may also be used for storing data that is manipulated by the processing circuit 606 when executing programming. The storage medium 610 may be any available non-transitory media that can be accessed by a general purpose or special purpose processor, including portable or fixed storage devices, optical storage devices, and various other mediums capable of storing, containing and/or carrying programming By way of example and not limitation, the storage medium 610 may include a non-transitory computer-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 610 may be coupled to the processing circuit 606 such that the processing circuit 606 can read information from, and write information to, the storage medium 610. That is, the storage medium 610 can be coupled to the processing circuit 606 so that the storage medium 610 is at least accessible by the processing circuit 606, including examples where the storage medium 610 is integral to the processing circuit 606 and/or examples where the storage medium 610 is separate from the processing circuit 606 (e.g., resident in the processing system 602, external to the processing system 602, distributed across multiple entities).

Programming stored by the storage medium 610, when executed by the processing circuit 606, can cause the processing circuit 606 to perform one or more of the various functions and/or process steps described herein. In at least some examples, the storage medium 610 may include power headroom report (PHR) calculation operations 624, uplink (UL) scheduling operations 626, and/or transmission operations 628. The PHR calculation operations 624 are generally adapted to cause the processing circuit 606 to calculate a maximum transmit power ($P_{max}$) based at least in part on current conditions for MPE, and calculate a power headroom report (PHR) based on the calculated $P_{max}$, as described herein. The UL scheduling operations 626 are generally adapted to cause the processing circuit 606 to determine uplink scheduling information, including an uplink duty cycle ($\delta$), a number of resource blocks (RBs) per symbol ($N_{RB}$), and an MCS index (m) to allocate a total energy E bounded by the MPE requirements such that the uplink throughput in a subsequent transmission interval is maximized for an uplink transmission, as described herein. The transmission operations 628 are generally adapted to cause the processing circuit 606 to transmit uplink scheduling information to a scheduling entity, as described herein.

Thus, according to one or more aspects of the present disclosure, the processing circuit 606 is adapted to perform (independently or in conjunction with the storage medium 610) any or all of the processes, functions, steps and/or routines for any or all of the scheduled entities described herein (e.g., UE 106, 222, 224, 226, 228, 230, 232, 234, 236, 238, 240, and 242, scheduled entity 402, 600). As used herein, the term "adapted" in relation to the processing circuit 606 may refer to the processing circuit 606 being one or more of configured, employed, implemented, and/or programmed (in conjunction with the storage medium 610) to perform a particular process, function, step and/or routine according to various features described herein.

Figure 7:
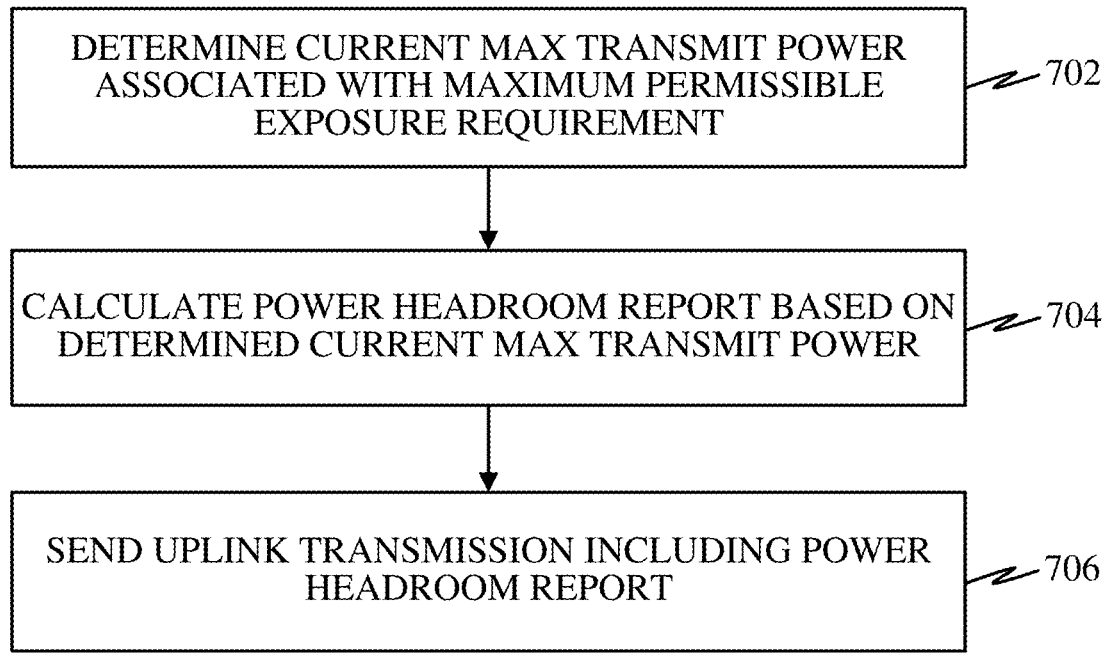
FIG. 7 is a flow diagram illustrating a method operational on a scheduled entity according to some aspects.

FIG. 7 is a flow diagram illustrating at least one example of a method operational on a scheduled entity, such as the scheduled entity 600. Referring to FIGS. 6 and 7, a scheduled entity 600 may determine a current maximum transmit power ($P_{max}$) associated with current conditions for MPE at 702. For example, the processing system 602 may include logic (e.g., PHR calculation circuit/module 618, PHR calculation operations 624) to determine a current maximum transmit power ($P_{max}$) associated with current conditions for MPE. As noted previously, the MPE requirements remain constant, but the maximum transmit power level ($P_{max}$) associated with the MPE requirements will vary with respect to the operation of the scheduled entity 600 with relation to the user. For example, proximity of the scheduled entity 600 to the user can result in a change of the maximum transmit power level within the MPE requirements (e.g., lower the $P_{max}$ when closer to user, higher $P_{max}$ when further away from user). As a result, the scheduled entity 600 can dynamically calculate the $P_{max}$ based on the changing conditions.

At 704, the scheduled entity 600 may calculate a power headroom report (PHR) based on the determined current $P_{max}$. For example, the processing system 602 may include logic (e.g., PHR calculation circuit/module 618, PHR calculation operations 624) to calculate the PHR based on the determined current $P_{max}$. The power headroom report may be calculated as the difference between the $P_{max}$ and the actual transmit power at a given interval. For example, the power headroom report may be calculated according to the equation: $PHR(i)=P_{max}(i)-P_{tx}(i)$, where PHR(i) represents the power headroom report at transmission interval 'i', $P_{max}(i)$ is the maximum transmit power level within the MPE requirements at the transmission interval, and $P_{tx}(i)$ is the actual UE transmit power at the transmission interval.

At 706, the scheduled entity 600 may send an uplink transmission including the PHR. For example, the processing system 602 may include logic (e.g., transmission circuit/module 622, transmission operations 628) to send an uplink transmission via the transceiver 614, where the uplink transmission includes the PHR.

Figure 8:
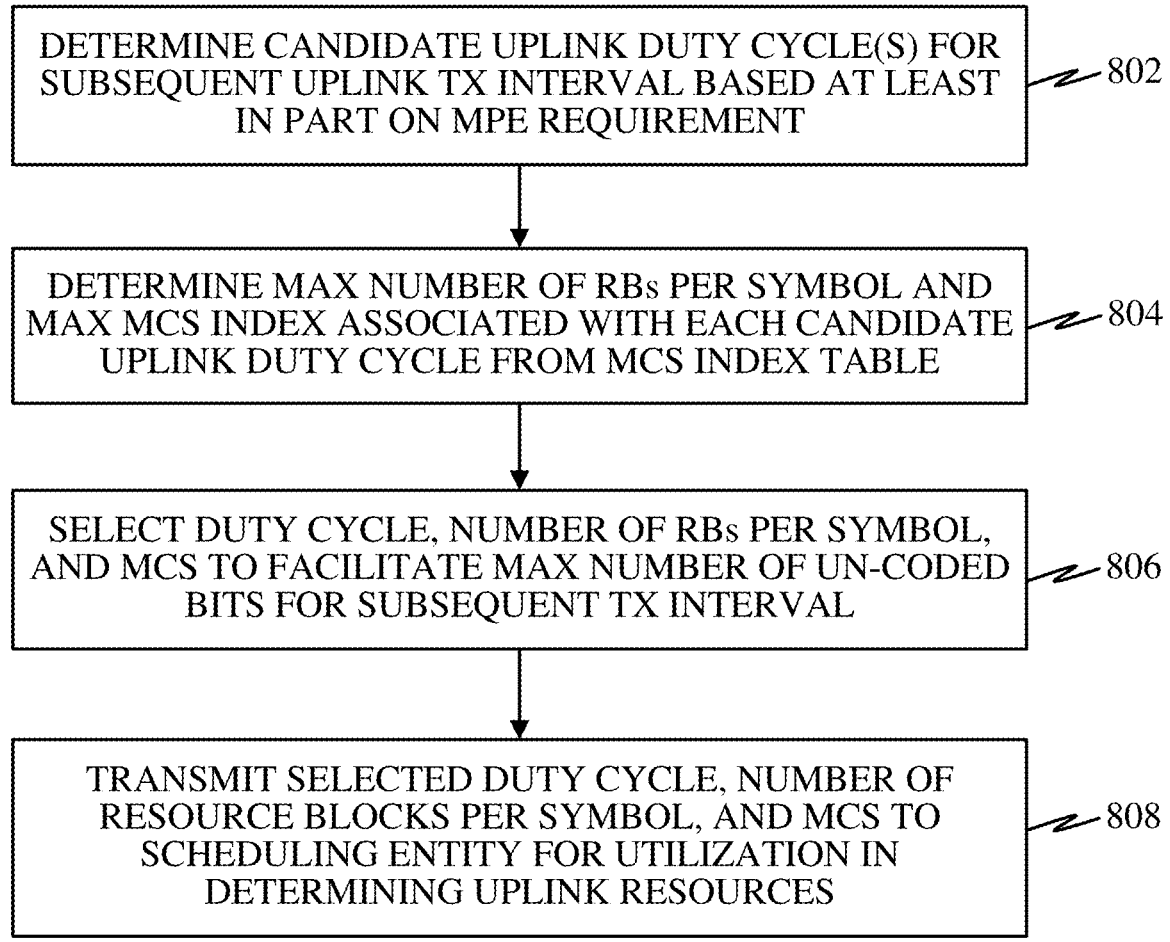
FIG. 8 is a flow diagram illustrating a method operational on a scheduled entity according to some aspects.

FIG. 8 is a flow diagram illustrating at least one example of a method operational on a scheduled entity, such as the scheduled entity 600. Referring to FIGS. 6 and 8, a scheduled entity 600 may determine a one or more candidate uplink duty cycles (δ) for a subsequent uplink transmission based at least in part on a MPE requirement at 802. For example, the processing system 602 may include logic (e.g., uplink (UL) scheduling circuit/module 620, uplink (UL) scheduling operations 626) to determine the one or more candidate uplink duty cycles (δ) for a subsequent uplink transmission based at least in part on a MPE requirement.

In at least one implementation, the processing system 602 may calculate a duty cycle range, and identify each candidate uplink duty cycle (δ) within the duty cycle range. Calculating the duty cycle range may include determining a lower threshold of the duty cycle range by obtaining a total available energy (E) designated by the MPE requirement divided by a product of a number of symbols in the subsequent uplink transmission interval (N) and a device maximum transmit power level ($P_{MTPL}$). Thus, the lower threshold of the duty cycle range may be expressed as $$\frac{E}{N \cdot P_{MTPL}}.$$

The total available energy (E) may be determined utilizing the PHR described above as being determined based on the MPE requirement, as well as maximum transmit power ($P_{max}$), uplink duty cycle, maximum power reduction (MPR), etc.

Calculating the duty cycle range may further include determining an upper threshold of the duty cycle range from a network configured maximum uplink duty cycle ($\delta_{NW}$). The duty cycle range may accordingly be calculated by the processing system 602 using the following formula $$\frac{E}{N \cdot P_{MTPL}} \le \delta \le \delta_{NW}.$$

Further, each candidate uplink duty cycle (δ) within the range may be identified.

At 804, the scheduled entity 600 may determine a maximum number of resource blocks per symbol ($N_{RB}$) and a maximum MCS index (m) associated with each candidate uplink duty cycle (δ) from a predefined MCS index table. For example, the processing system 602 may include logic (e.g., uplink (UL) scheduling circuit/module 620, uplink (UL) scheduling operations 626) to determine a maximum number of resource blocks per symbol ($N_{RB}$) and a maximum MCS index (m) associated with each candidate uplink duty cycle (δ) from a predefined MCS index table.

In one or more implementations, the processing system 602 may perform step 804 by calculating a CINR value for each of a plurality of different numbers of resource blocks per symbol, and identifying the maximum number of resource blocks per symbol and the maximum MCS index where the calculated CINR is equal to or greater than a minimum required CINR in the MCS index table. For example, for each candidate duty cycle (δ), the receive CINR can be calculated by the following formula $$CINR_{dB} = \left(\frac{P_{cap}}{N_{RB}}\right)_{dB} - (PL)_{dB} - (P_{noise}^{RB})_{dB}$$

where $(PL)_{dB}$ is the pathloss including all TX/RX antenna gains and cable losses between the scheduled entity and the scheduling entity, $(P_{noise}^{RB})_{dB}=-174+10 \cdot \log_{10}(12 \cdot 120 \cdot 10^3)+(NF)_{dB}$ is the noise power per RB, $(NF)_{dB}$ is the base station receiver noise figure, and $N_{RB}$ is the number of RB's in frequency domain used per symbol. As noted above, the number of RBs per symbol ($N_{RB}$) is the one value in the above CINR equation that is variable.

Using the CINR equation, the processing system 602 may determine the largest number of RBs per symbol ($N_{RB}$) and MCS index (m) which satisfy $CINR_{DB} \ge CINR_m$, where m is the MCS index in a predefined table, such as the example Table 1 above.

At 806, the scheduled entity 600 may select a duty cycle (δ), a number of resource blocks per symbol ($N_{RB}$), and MCS that facilitates a largest number of un-coded bits for the subsequent uplink transmission interval. For example, the processing system 602 may include logic (e.g., uplink (UL) scheduling circuit/module 620, uplink (UL) scheduling operations 626) to select the duty cycle (δ), number of resource blocks per symbol ($N_{RB}$), and MCS that facilitates a largest number of un-coded bits for the subsequent uplink transmission interval.

In at least one implementation, the processing system 602 may determine the total number of un-coded bits that scheduled entity 600 can transmit in the next transmission interval using (δ, $N_{RB}$, m) is $N_{bits}^{TI}(\delta, N_{RB}, m) = N \cdot \delta \cdot N_{bits}^{symbol}$ for all candidate uplink duty cycles (δ). The processing system 602 may utilize the equation $N_{bits}^{TI}(\delta', N'_{RB}, m') = \arg\max_\delta N_{bits}^{TI}(\delta, N_{RB}, m)$ to select the largest number of un-coded bits that the scheduled entity 600 can transmit in the next transmission interval over all candidate duty cycles (δ).

At 808, the scheduled entity 600 may transmit the selected duty cycle (δ), number of resource blocks per symbol ($N_{RB}$), and MCS to a scheduling entity for utilization by the scheduling entity in determining uplink resources. For example, the processing system 602 may include logic (e.g., transmission operations 628) to send via the transceiver 614 the selected duty cycle (δ), number of resource blocks per symbol ($N_{RB}$), and MCS to the scheduling entity.

Figure 9:
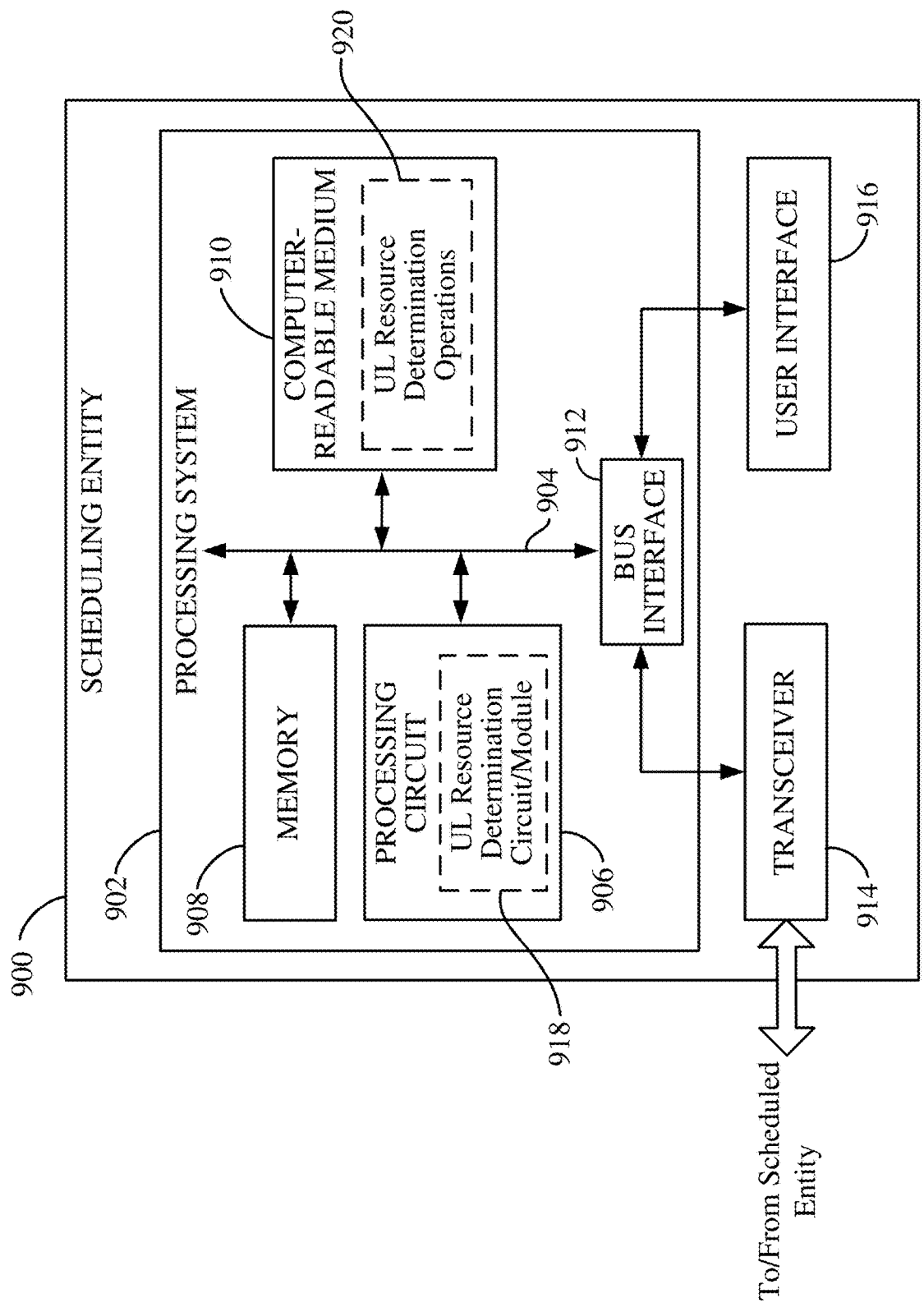
FIG. 9 is a block diagram conceptually illustrating an example of a hardware implementation for a scheduling entity according to some aspects.

Turning now to FIG. 9, a block diagram illustrating select components of a scheduling entity 900 employing a processing system 902 according to at least one example of the present disclosure. Similar to the processing system 902 in FIG. 9, the processing system 902 may be implemented with a bus architecture, represented generally by the bus 904. The bus 904 may include any number of interconnecting buses and bridges depending on the specific application of the processing system 902 and the overall design constraints. The bus 904 communicatively couples together various circuits including one or more processors (represented generally by the processing circuit 906), a memory 908, and computer-readable media (represented generally by the storage medium 910). The bus 904 may also link various other circuits such as timing sources, peripherals, voltage regulators, and power management circuits, which are well known in the art, and therefore, will not be described any further. A bus interface 912 provides an interface between the bus 904 and a transceiver 914. The transceiver 914 provides a means for communicating with various other apparatus over a transmission medium. Depending upon the nature of the apparatus, a user interface 916 (e.g., keypad, display, speaker, microphone, joystick) may also be provided.

The processing circuit 906 is responsible for managing the bus 904 and general processing, including the execution of programming stored on the computer-readable storage medium 910. The programming, when executed by the processing circuit 906, causes the processing system 902 to perform the various functions described below for any particular apparatus. The computer-readable storage medium 910 and the memory 908 may also be used for storing data that is manipulated by the processing circuit 906 when executing programming.

The processing circuit 906 is arranged to obtain, process and/or send data, control data access and storage, issue commands, and control other desired operations. The processing circuit 906 may include circuitry adapted to implement desired programming provided by appropriate media in at least one example, and/or circuitry adapted to perform one or more functions described in this disclosure. The processing circuit 906 may be implemented and/or configured according to any of the examples of the processing circuit 606 described above.

In some instances, the processing circuit 906 may include an uplink (UL) resource determination circuit and/or module 918. The UL resource determination circuit/module 918 may generally include circuitry and/or programming (e.g., programming stored on the storage medium 910) adapted to determine uplink resources based at least in part on a received power headroom report, including determining an uplink duty cycle ($\delta$), a number of resource blocks (RBs) per symbol ($N_{RB}$), and an MCS index (m) to allocate a total energy E bounded by the MPE requirements such that the uplink throughput in a subsequent transmission interval is maximized for an uplink transmission. As noted previously, reference to circuitry and/or programming may be generally referred to as logic (e.g., logic gates and/or data structure logic).

The storage medium 910 may represent one or more computer-readable devices for storing programming, such as processor executable code or instructions (e.g., software, firmware), electronic data, databases, or other digital information. The storage medium 910 may be configured and/or implemented in a manner similar to the storage medium 610 described above.

Programming stored by the storage medium 910, when executed by the processing circuit 906, can cause the processing circuit 906 to perform one or more of the various functions and/or process steps described herein. In at least some examples, the storage medium 910 may include UL resource determination operations 920 adapted to cause the processing circuit 906 to determine uplink resources based at least in part on a received power headroom report, including determining an uplink duty cycle ($\delta$), a number of resource blocks (RBs) per symbol ($N_{RB}$), and an MCS index (m) to allocate a total energy E bounded by the MPE requirements such that the uplink throughput in a subsequent transmission interval is maximized for an uplink transmission, as described herein. Thus, according to one or more aspects of the present disclosure, the processing circuit 906 is adapted to perform (independently or in conjunction with the storage medium 910) any or all of the processes, functions, steps and/or routines for any or all of the scheduling entities described herein (e.g., base station 210, 212, 214, 218, UE 238, quadcopter 220, scheduling entity 404, 900). As used herein, the term "adapted" in relation to the processing circuit 906 may refer to the processing circuit 906 being one or more of configured, employed, implemented, and/or programmed (in conjunction with the storage medium 910) to perform a particular process, function, step and/or routine according to various features described herein.

Figure 10:
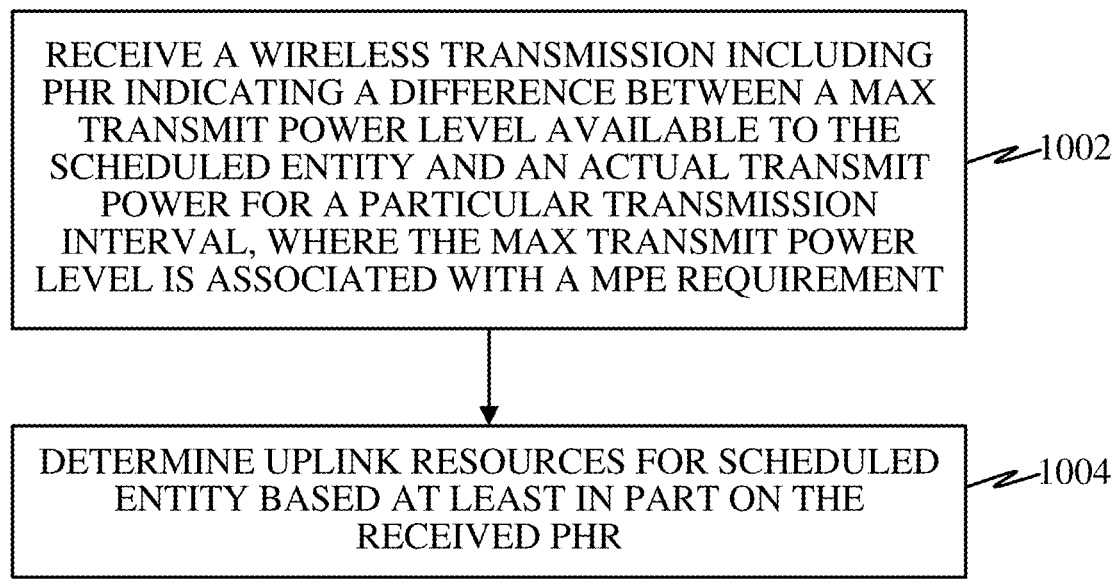
FIG. 10 is a flow diagram illustrating a method operational on a scheduling entity according to some aspects.

FIG. 10 is a flow diagram illustrating at least one example of a method operational on a scheduling entity, such as the scheduling entity 900. Referring to FIGS. 9 and 10, a scheduling entity 900 may receive a wireless transmission from a scheduled entity at 1002. For example, the processing system 902 may receive a wireless transmission via the transceiver 914 from a scheduled entity. The wireless transmission may include a power headroom report (PHR) indicating a difference between a maximum transmit power level ($P_{max}$) available to the scheduled entity and an actual transmit power $P_{tx}$ for a particular transmission interval, where the $P_{max}$ is associated with a maximum permissible exposure (MPE) requirement. In various implementations, the received transmission may also include an indication of a maximum transmit power (Pmax), uplink duty cycle, maximum power reduction (MPR), etc.

At 1004, the scheduling entity 900 may determine uplink resources for the scheduled entity based at least in part on the received PHR. For example, the processing system 902 may include logic (e.g., uplink (UL) resource determination circuit/module 918, uplink (UL) resource determination operations 920) to determine uplink time and frequency resources and/or MCS for the scheduled entity.

Figure 11:
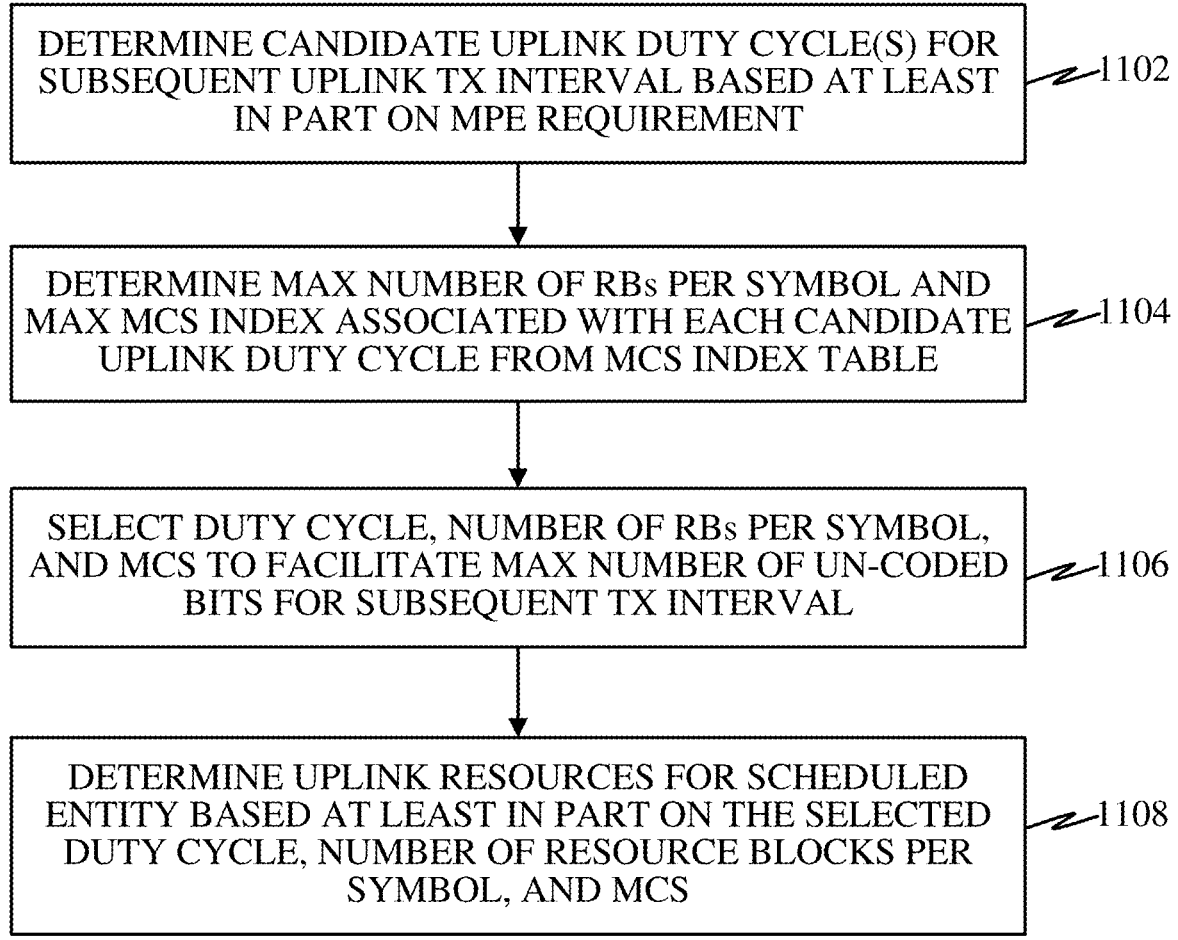
FIG. 11 is a flow diagram illustrating a method operational on a scheduling entity according to some aspects.

FIG. 11 is a flow diagram illustrating at least one example of a method operational on a scheduling entity, such as the scheduling entity 900. Referring to FIGS. 9 and 11, a scheduling entity 900 may determine a one or more candidate uplink duty cycles ($\delta$) for a subsequent uplink transmission based at least in part on a MPE requirement at 1102. For example, the processing system 902 may include logic (e.g., uplink (UL) resource determination circuit/module 918, uplink (UL) resource determination operations 920) to determine the one or more candidate uplink duty cycles ($\delta$) for a subsequent uplink transmission based at least in part on a MPE requirement.

In at least one implementation, the processing system 902 may calculate a duty cycle range, and identify each candidate uplink duty cycle ($\delta$) within the duty cycle range. Calculating the duty cycle range may include determining a lower threshold of the duty cycle range by obtaining a total available energy (E) designated by the MPE requirement divided by a product of a number of symbols in the subsequent uplink transmission interval (N) and a device maximum transmit power level ($P_{MTPL}$). Thus, the lower threshold of the duty cycle range may be expressed as $$\frac{E}{N \cdot P_{MTPL}}.$$

The total available energy (E) may be obtained from the scheduled entity, and/or determined utilizing information received from the scheduling entity, such as the PHR described above as being determined based on the MPE requirement, a maximum transmit power (Pmax), an uplink duty cycle, a maximum power reduction (MPR), etc.

Calculating the duty cycle range may further include determining an upper threshold of the duty cycle range from a network configured maximum uplink duty cycle ($\delta_{NW}$). The duty cycle range may accordingly be calculated by the processing system 902 using the following formula $$\frac{E}{N \cdot P_{MTPL}} \leq \delta \leq \delta_{NW}.$$

Further, each candidate uplink duty cycle ($\delta$) within the range may be identified.

At 1104, the scheduling entity 900 may determine a maximum number of resource blocks per symbol ($N_{RB}$) and a maximum MCS index (m) associated with each candidate uplink duty cycle ($\delta$) from a predefined MCS index table. For example, the processing system 902 may include logic (e.g., uplink (UL) resource determination circuit/module 918, uplink (UL) resource determination operations 920) to determine a maximum number of resource blocks per symbol ($N_{RB}$) and a maximum MCS index (m) associated with each candidate uplink duty cycle ($\delta$) from a predefined MCS index table.

In one or more implementations, the processing system 902 may perform step 1104 by calculating a CINR value for each of a plurality of different numbers of resource blocks per symbol, and identifying the maximum number of resource blocks per symbol and the maximum MCS index where the calculated CINR is equal to or greater than a minimum required CINR in the MCS index table. For example, for each candidate duty cycle ($\delta$), the receive CINR can be calculated by the following formula $$CINR_{dB} = \left(\frac{P_{cap}}{N_{RB}}\right)_{dB} - (PL)_{dB} - (P_{noise}^{RB})_{dB}$$

where $(PL)_{dB}$ is the pathloss including all TX/RX antenna gains and cable losses between the scheduled entity and the scheduling entity, $(P_{noise}^{RB})_{dB} = -174 + 10 \cdot \log_{10}(12 \cdot 120 \cdot 10^3) + (NF)_{dB}$ is the noise power per RB, $(NF)_{dB}$ is the base station receiver noise figure, and $N_{RB}$ is the number of RB's in frequency domain used per symbol. As noted above, the number of RBs per symbol ($N_{RB}$) is the one value in the above CINR equation that is variable.

Using the CINR equation, the processing system 902 may determine the largest number of RBs per symbol ($N_{RB}$) and MCS index (m) which satisfy $CINR_{DB} \geq CINR_m$, where "m" is the MCS index in a predefined table, such as the example Table 1 above.

At 1106, the scheduling entity 900 may select a duty cycle ($\delta$), a number of resource blocks per symbol ($N_{RB}$), and MCS that facilitates a largest number of un-coded bits for the subsequent uplink transmission interval. For example, the processing system 902 may include logic (e.g., uplink (UL) resource determination circuit/module 918, uplink (UL) resource determination operations 920) to select the duty cycle ($\delta$), number of resource blocks per symbol ($N_{RB}$), and MCS that facilitates a largest number of un-coded bits for the subsequent uplink transmission interval.

In at least one implementation, the processing system 902 may determine the total number of un-coded bits that relevant scheduled entity can transmit in the next transmission interval using ($\delta$, $N_{RB}$, m) is $N_{bits}^{TI}(\delta, N_{RB}, m) = N \cdot \delta \cdot N_{bits}^{symbol}$ for all candidate uplink duty cycles ($\delta$). The processing system 902 may utilize the equation $N_{bits}^{TI}(\delta', N'_{RB}, m) = \arg\max_\delta N_{bits}^{TI}(\delta, N_{RB}, m)$ to select the largest number of un-coded bits that the scheduled entity can transmit in the next transmission interval over all candidate duty cycles ($\delta$).

At 1108, the scheduling entity 900 may determine uplink resources for the scheduled entity based at least in part on the selected duty cycle ($\delta$), a number of resource blocks per symbol ($N_{RB}$), and MCS. For example, the processing system 902 may include logic (e.g., uplink (UL) resource determination circuit/module 918, uplink (UL) resource determination operations 920) to determine uplink resources for the scheduled entity based at least in part on the selected duty cycle ($\delta$), a number of resource blocks per symbol ($N_{RB}$), and MCS.

The processes shown in FIGS. 4, 7, 8, 10, and 11 may include additional aspects, such as any single aspect or any combination of aspects described below and/or in connection with one or more other processes described elsewhere herein.

In a first aspect, a wireless communication device (e.g., a UE, a base station) may determine one or more candidate uplink duty cycles for a subsequent uplink transmission interval based at least in part on a maximum permissible exposure (MPE) requirement. A determination may then be made for a maximum number of resource blocks per symbol and a maximum modulation and coding scheme (MSC) index associated with each of the one or more candidate uplink duty cycles from a predefined MCS index table. A duty cycle, number of resource blocks per symbol, and MCS that facilitates a largest number of un-coded bits for the subsequent uplink transmission interval may then be selected.

In a second aspect, alone or in combination with the first aspect, a wireless communication device may calculate a duty cycle range, and identify each candidate uplink duty cycle within the duty cycle range.

In a third aspect, alone or in combination with one or more of the first and second aspects, a wireless communication device may determine a lower threshold of the duty cycle range by obtaining a total available energy designated by the MPE requirement divided by a product of a number of symbols in the subsequent uplink transmission interval and a device maximum transmit power level. A wireless communication device may further determine an upper threshold of the duty cycle range from a network configured maximum uplink duty cycle.

In a fourth aspect, alone or in combination with one or more of the first through third aspects, a wireless communication device may calculate a carrier to interference-plus-noise ratio (CINR) value for each of a plurality of different numbers of resource blocks per symbol, and identify the maximum number of resource blocks per symbol and the maximum MCS index where the calculated CINR is equal to or greater than a minimum required CINR in the MCS index table.

In a fifth aspect, alone or in combination with one or more of the first through fourth aspects, a wireless communication device may determine a number of un-coded bits per symbol corresponding to each MCS index, and identify the largest number of un-coded bits that can be transmitted in the subsequent uplink transmission interval over all candidate duty cycles.

In a sixth aspect, alone or in combination with one or more of the first through fifth aspects, a wireless communication device may transmit to a scheduling entity the selected duty cycle, number of resource blocks per symbol, and MCS for utilization by the scheduling entity in determining uplink resources for the scheduled entity.

In a seventh aspect, alone or in combination with one or more of the first through sixth aspects, a wireless communication device may determine uplink resources for a scheduled entity based at least in part on the selected duty cycle, number of resource blocks per symbol, and MCS.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

While the above discussed aspects, arrangements, and embodiments are discussed with specific details and particularity, one or more of the components, steps, features and/or functions illustrated in FIGS. 1, 2, 3, 4, 5, 6, 7, 8, 9, 10, and/or 11 may be rearranged and/or combined into a single component, step, feature or function or embodied in several components, steps, or functions. Additional elements, components, steps, and/or functions may also be added or not utilized without departing from the novel features of the present disclosure. The apparatus, devices and/or components illustrated in FIGS. 1, 2, 4, 6 and/or 9 may be configured to perform or employ one or more of the methods, features, parameters, and/or steps described herein with reference to FIGS. 3, 4, 5, 7, 8, 10, and/or 11. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A wireless communication device, comprising:
 a transceiver; and
 a processor communicatively coupled to the transceiver, the processor configured to:
  determine one or more candidate uplink duty cycles for a subsequent uplink transmission interval based at least in part on a maximum permissible exposure (MPE) requirement;
  determine a maximum number of resource blocks per symbol and a maximum modulation and coding scheme (MSC) index associated with each of the one or more candidate uplink duty cycles from a predefined MCS index table; and
  select a duty cycle, number of resource blocks per symbol, and MCS that facilitates a largest number of un-coded bits for the subsequent uplink transmission interval.

2. The wireless communication device of claim 1, wherein the processor configured to determine one or more candidate uplink duty cycles for a subsequent uplink transmission interval based at least in part on a MPE requirement comprises the processor configured to:
 calculate a duty cycle range; and
 identify each candidate uplink duty cycle within the duty cycle range.

3. The wireless communication device of claim 2, wherein the processor configured to calculate a duty cycle range comprises the processor configured to:
 determine a lower threshold of the duty cycle range by obtaining a total available energy designated by the MPE requirement divided by a product of a number of symbols in the subsequent uplink transmission interval and a device maximum transmit power level; and
 determine an upper threshold of the duty cycle range from a network configured maximum uplink duty cycle.

4. The wireless communication device of claim 1, wherein the processor configured to determine a maximum number of resource blocks per symbol and a maximum MCS index associated with each of the one or more candidate uplink duty cycles from a predefined MCS index table comprises the processor configured to:
　calculate a carrier to interference-plus-noise ratio (CINR) value for each of a plurality of different numbers of resource blocks per symbol; and
　identify the maximum number of resource blocks per symbol and the maximum MCS index where the calculated CINR is equal to or greater than a minimum required CINR in the MCS index table.

5. The wireless communication device of claim 1, wherein the processor configured to select a duty cycle, number of resource blocks per symbol, and MCS that facilitates a largest number of un-coded bits for the subsequent uplink transmission interval comprises the processor configured to:
　determine a number of un-coded bits per symbol corresponding to each MCS index; and
　identify the largest number of un-coded bits that can be transmitted in the subsequent uplink transmission interval over all candidate duty cycles.

6. The wireless communication device of claim 1, wherein the wireless communication device comprises a scheduled entity, and the processor is further configured to:
　transmit to a scheduling entity via the transceiver the selected duty cycle, number of resource blocks per symbol, and MCS for utilization by the scheduling entity in determining uplink resources for the scheduled entity.

7. The wireless communication device of claim 1, wherein the wireless communication device comprises a scheduling entity, and the processor is further configured to:
　determine uplink resources for a scheduled entity based at least in part on the selected duty cycle, number of resource blocks per symbol, and MCS.

8. A method of wireless communication in a wireless communication device, comprising:
　determining, by the wireless communication device, one or more candidate uplink duty cycles for a subsequent uplink transmission interval based at least in part on a maximum permissible exposure (MPE) requirement;
　determining, by the wireless communication device, a maximum number of resource blocks per symbol and a maximum modulation and coding scheme (MSC) index associated with each of the one or more candidate uplink duty cycles from a predefined MCS index table; and
　selecting, by the wireless communication device, a duty cycle, number of resource blocks per symbol, and MCS that facilitates a largest number of un-coded bits for the subsequent uplink transmission interval.

9. The method of claim 8, wherein determining, by the wireless communication device, one or more candidate uplink duty cycles for a subsequent uplink transmission interval based at least in part on a MPE requirement comprises:
　calculating, by the wireless communication device, a duty cycle range; and
　identifying each candidate uplink duty cycle within the duty cycle range.

10. The method of claim 9, wherein calculating, by the wireless communication device, a duty cycle range comprises:
　determining, by the wireless communication device, a lower threshold of the duty cycle range by obtaining a total available energy designated by the MPE requirement divided by a product of a number of symbols in the subsequent uplink transmission interval and a device maximum transmit power level; and
　determining, by the wireless communication device, an upper threshold of the duty cycle range from a network configured maximum uplink duty cycle.

11. The method of claim 8, wherein determining, by the wireless communication device, a maximum number of resource blocks per symbol and a maximum MCS index associated with each of the one or more candidate uplink duty cycles from a predefined MCS index table comprises:
　calculating, by the wireless communication device, a carrier to interference-plus-noise ratio (CINR) value for each of a plurality of different numbers of resource blocks per symbol; and
　identifying the maximum number of resource blocks per symbol and the maximum MCS index where the calculated CINR is equal to or greater than a minimum required CINR in the MCS index table.

12. The method of claim 8, wherein selecting, by the wireless communication device, a duty cycle, number of resource blocks per symbol, and MCS that facilitates a largest number of un-coded bits for the subsequent uplink transmission interval comprises:
　determining, by the wireless communication device, a number of un-coded bits per symbol corresponding to each MCS index; and
　identifying the largest number of un-coded bits that can be transmitted in the subsequent uplink transmission interval over all candidate duty cycles.

13. The method of claim 8, further comprising:
　transmitting to a scheduling entity the selected duty cycle, number of resource blocks per symbol, and MCS for utilization by the scheduling entity in determining uplink resources.

14. The method of claim 8, further comprising:
　determining, by the wireless communication device, uplink resources for a scheduled entity based at least in part on the selected duty cycle, number of resource blocks per symbol, and MCS.

15. An apparatus for wireless communication, comprising:
　means for determining one or more candidate uplink duty cycles for a subsequent uplink transmission interval based at least in part on a maximum permissible exposure (MPE) requirement;
　means for determining a maximum number of resource blocks per symbol and a maximum modulation and coding scheme (MSC) index associated with each of the one or more candidate uplink duty cycles from a predefined MCS index table; and
　means for selecting a duty cycle, a number of resource blocks per symbol, and MCS that facilitates a largest number of un-coded bits for the subsequent uplink transmission interval.

16. The apparatus of claim 15, wherein determining one or more candidate uplink duty cycles for a subsequent uplink transmission interval based at least in part on a MPE requirement comprises:
　calculating a duty cycle range; and
　identifying each candidate uplink duty cycle within the duty cycle range.

17. The apparatus of claim 16, wherein calculating a duty cycle range comprises:
　determining a lower threshold of the duty cycle range by obtaining a total available energy designated by the MPE requirement divided by a product of a number of symbols in the subsequent uplink transmission interval and a device maximum transmit power level; and determining an upper threshold of the duty cycle range from a network configured maximum uplink duty cycle.

18. The apparatus of claim 15, wherein determining a maximum number of resource blocks per symbol and a maximum MCS index associated with each of the one or more candidate uplink duty cycles from a predefined MCS index table comprises:

calculating a carrier to interference-plus-noise ratio (CINR) value for each of a plurality of different numbers of resource blocks per symbol; and identifying the maximum number of resource blocks per symbol and the maximum MCS index where the calculated CINR is equal to or greater than a minimum required CINR in the MCS index table.

19. The apparatus of claim 15, wherein selecting a duty cycle, number of resource blocks per symbol, and MCS that facilitates a largest number of un-coded bits for the subsequent uplink transmission interval comprises:

determining a number of un-coded bits per symbol corresponding to each MCS index; and identifying the largest number of un-coded bits that can be transmitted in the subsequent uplink transmission interval over all candidate duty cycles.

20. The apparatus of claim 15, further comprising:

means for transmitting to a scheduling entity the selected duty cycle, number of resource blocks per symbol, and MCS for utilization by the scheduling entity in determining uplink resources.

21. The apparatus of claim 15, further comprising:

means for determining uplink resources for a scheduled entity based at least in part on the selected duty cycle, number of resource blocks per symbol, and MCS.

22. A non-transitory computer readable storage medium storing processor-executable instructions for causing a processing circuit to:

determine one or more candidate uplink duty cycles for a subsequent uplink transmission interval based at least in part on a maximum permissible exposure (MPE) requirement;

determine a maximum number of resource blocks per symbol and a maximum modulation and coding scheme (MSC) index associated with each of the one or more candidate uplink duty cycles from a predefined MCS index table; and select a duty cycle, number of resource blocks per symbol, and MCS that facilitates a largest number of un-coded bits for the subsequent uplink transmission interval.

23. The computer readable storage medium of claim 22, wherein the processor-executable instructions for causing a processing circuit to determine one or more candidate uplink duty cycles for a subsequent uplink transmission interval based at least in part on a MPE requirement comprises processor-executable instructions for causing a processing circuit to:

calculate a duty cycle range; and identify each candidate uplink duty cycle within the duty cycle range.

24. The computer readable storage medium of claim 23, wherein the processor-executable instructions for causing a processing circuit to calculate a duty cycle range comprises processor-executable instructions for causing a processing circuit to:

determine a lower threshold of the duty cycle range by obtaining a total available energy designated by the MPE requirement divided by a product of a number of symbols in the subsequent uplink transmission interval and a device maximum transmit power level; and determine an upper threshold of the duty cycle range from a network configured maximum uplink duty cycle.

25. The computer readable storage medium of claim 22, wherein the processor-executable instructions for causing a processing circuit to determine a maximum number of resource blocks per symbol and a maximum MCS index associated with each of the one or more candidate uplink duty cycles from a predefined MCS index table comprises processor-executable instructions for causing a processing circuit to:

calculate a carrier to interference-plus-noise ratio (CINR) value for each of a plurality of different numbers of resource blocks per symbol; and identify the maximum number of resource blocks per symbol and the maximum MCS index where the calculated CINR is equal to or greater than a minimum required CINR in the MCS index table.

26. The computer readable storage medium of claim 22, wherein the processor-executable instructions for causing a processing circuit to select a duty cycle, number of resource blocks per symbol, and MCS that facilitates a largest number of un-coded bits for the subsequent uplink transmission interval comprises processor-executable instructions for causing a processing circuit to:

determine a number of un-coded bits per symbol corresponding to each MCS index; and identify the largest number of un-coded bits that can be transmitted in the subsequent uplink transmission interval over all candidate duty cycles.

27. The computer readable storage medium of claim 22, further comprising processor-executable instructions for causing a processing circuit to:

transmit to a scheduling entity via the transceiver the selected duty cycle, number of resource blocks per symbol, and MCS for utilization by the scheduling entity in determining uplink resources for the scheduled entity.

28. The computer readable storage medium of claim 22, further comprising processor-executable instructions for causing a processing circuit to:

determining uplink resources for a scheduled entity based at least in part on the selected duty cycle, number of resource blocks per symbol, and MCS.

* * * * *